(12) United States Patent
Endresen et al.

(10) Patent No.: US 9,330,275 B1
(45) Date of Patent: May 3, 2016

(54) LOCATION BASED DECRYPTION

(71) Applicant: AMAZON TECHNOLOGIES, INC., Reno, NV (US)

(72) Inventors: Geoffrey Eric Endresen, Everett, WA (US); Brian Scott Cripe, Seattle, WA (US); John Gilbert Focht, Kirkland, WA (US); Craig Vincent Kulfan, Bainbridge Island, WA (US); Bala Anirudh Kurakula, Bellevue, WA (US); Ian Aird Mosher, Seattle, WA (US); Viraj Vijay Sanghvi, Seattle, WA (US); Daniel Arthur Sommerfield, Mercer Island, WA (US); Jason Scott Wodicka, Seattle, WA (US); Christopher Charles Battey, Edmonds, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 13/852,644

(22) Filed: Mar. 28, 2013

(51) Int. Cl.
*G06F 21/00* (2013.01)
*G06F 21/62* (2013.01)
*H04L 29/06* (2006.01)
*G06F 21/64* (2013.01)

(52) U.S. Cl.
CPC ............ *G06F 21/6218* (2013.01); *G06F 21/64* (2013.01); *H04L 63/0428* (2013.01)

(58) Field of Classification Search
CPC . G06F 21/6218; G06F 2221/21; G06F 21/64; H04L 63/0428
USPC .................. 713/175, 176, 180; 380/247–250; 455/411, 550, 558, 456.3
See application file for complete search history.

(56) References Cited

U.S. PATENT DOCUMENTS

| | | | |
|---|---|---|---|
| 2001/0055392 A1* | 12/2001 | McDonnell et al. | 380/258 |
| 2002/0023219 A1* | 2/2002 | Treffers et al. | 713/176 |
| 2002/0177449 A1* | 11/2002 | McDonnell et al. | 455/456 |
| 2002/0194481 A1* | 12/2002 | Roelofsen et al. | 713/176 |
| 2004/0224702 A1* | 11/2004 | Chaskar | 455/456.3 |
| 2007/0140488 A1* | 6/2007 | Dharmaji et al. | 380/212 |
| 2007/0168294 A1* | 7/2007 | Tsurukawa | 705/59 |
| 2008/0114993 A1* | 5/2008 | Shankar et al. | 713/193 |
| 2008/0182592 A1* | 7/2008 | Cha et al. | 455/456.3 |
| 2009/0037742 A1* | 2/2009 | Narayanaswami | 713/186 |
| 2010/0217615 A1* | 8/2010 | Brown et al. | 705/1.1 |
| 2010/0229005 A1* | 9/2010 | Herman et al. | 713/193 |
| 2012/0159172 A1* | 6/2012 | Saxena et al. | 713/171 |
| 2012/0234058 A1* | 9/2012 | Neil | G07C 9/00571 70/91 |
| 2013/0019293 A1* | 1/2013 | Puppin | 726/7 |
| 2014/0013420 A1* | 1/2014 | Picionielli et al. | 726/17 |
| 2014/0075208 A1* | 3/2014 | Herman et al. | 713/193 |

* cited by examiner

Primary Examiner — Mohammad A Siddiqi
(74) Attorney, Agent, or Firm — Lindauer Law, PLLC

(57) ABSTRACT

Described herein are systems, devices and methods for decrypting content based on location. A media device may decrypt content based on determination of a location-based decryption event. The location-based decryption event may include the media device being located within a location previously defined as authorized to decrypt the content. The location-based decryption event may also include the media device being located within a predetermined distance of a designated reference object.

20 Claims, 10 Drawing Sheets

LOCATION BASED DECRYPTION

BACKGROUND

Media devices such as tablets and smartphones may often provide access to certain confidential information. To improve information security, confidential information may be encrypted. However, after a decryption key is obtained and the confidential information is accessed, an adversarial user may attempt to compromise the confidential information. For example, the adversarial user may copy the confidential information or transmit the confidential information to an unauthorized third party. Accordingly, a need exists for the further development of information security systems.

Figure 1:
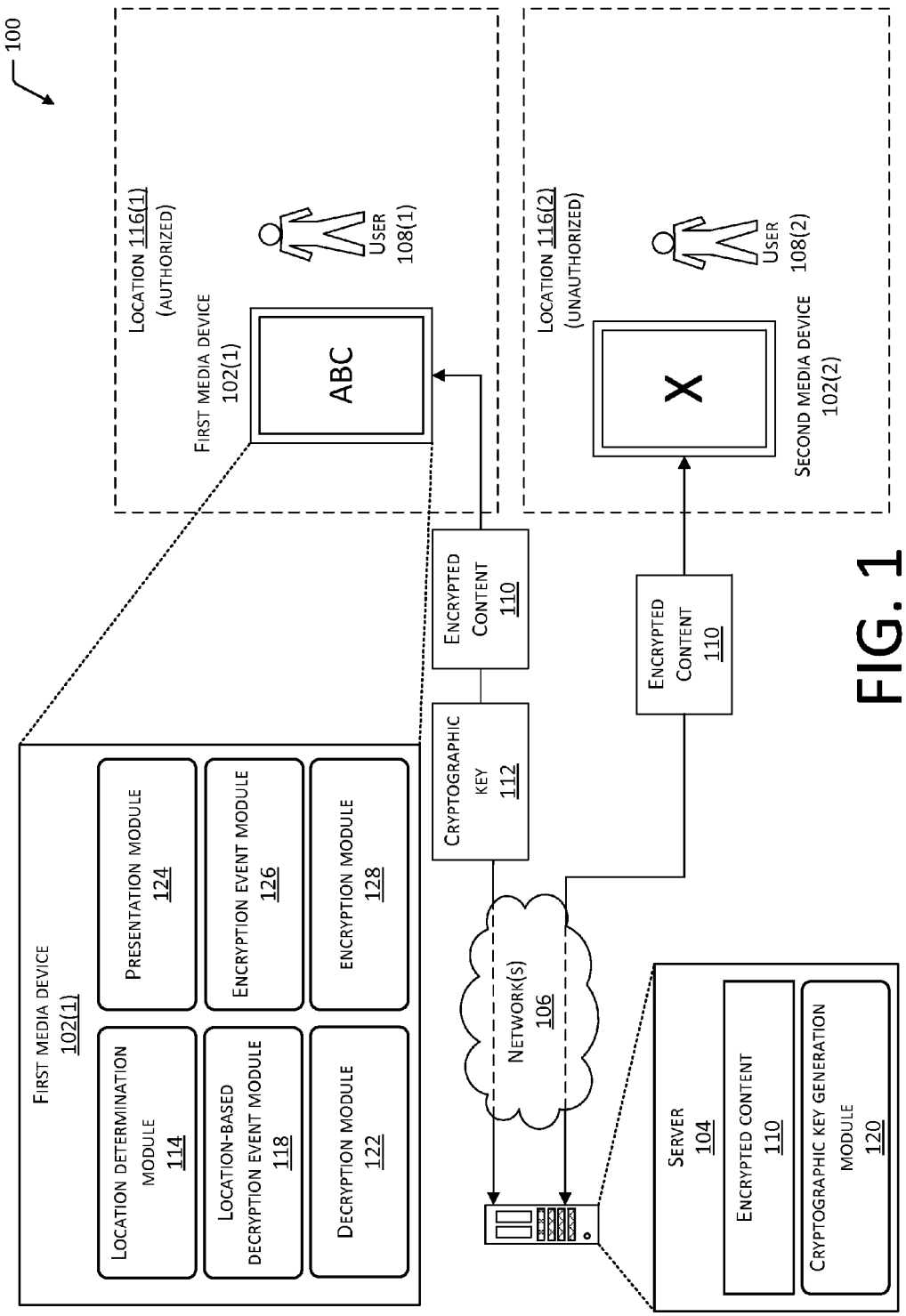
FIG. 1 is a block diagram of a system for decrypting content based on the location of a media device, illustrating the location-based decryption event including the media device located within a predetermined geolocation.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

The present disclosure relates to systems and methods for controlling encryption of content on media devices based on location. Location may be referred to as the position of the media device in space. The position may include a geographic location ("geolocation") such as latitude and longitude, altitude, particular street address and so forth. The location may be specified by a "geofence" such as a set of coordinates designating a boundary, or distance from a designated geographic point. The position may also include a relative position within so many feet of a designated reference object which may be placed somewhere, such as within a conference room, and so forth. The media device may be determined to be "at" or "in" an authorized location when within the geofence, a particular distance from the designated geographic point, the relative position, and so forth.

Based on a determination of a location-based decryption event, the media device may decrypt at least a portion of encrypted content and present the decrypted content to a user of the media device. In some implementations, based on a determination of an encryption event, the media device terminates the presentation of the decrypted content. The location may be determined using a location sensor, such as a satellite-based navigation system, inertial navigation, dead reckoning, and so forth.

The location-based decryption event may include a variety of events. In one implementation, the location-based decryption event may include the media device being located in an authorized location. The authorized location may be described as a location such as a portion of space within a building or other structure, separated by walls or partitions from other parts. The authorized location may also be described as area defined by latitudes and longitudes. In some implementations, the media device is unable to receive the cryptographic key unless the media device is located within the authorized location. The authorized location may be designated or selected by the user. Conversely, certain locations described herein may be referred to as unauthorized locations. In some implementations, because the media device is located in an unauthorized location, the media device may not be able to receive the cryptographic key.

In another implementation, the location-based decryption event includes the media device being located within a predetermined distance from a designated reference object. The designated reference object may include at least one of a communication device, a server, a near field communication tag, or other device. The cryptographic key may be received from the designated reference object. The encrypted content may be received from the designated reference object. In some implementations, another media device may operate as the designated reference object.

The encryption event may include a variety of events. The encryption event may include a change in the location of the media device. For example, the encryption event may include the media device not located within the authorized location. Other encryption events are discussed in detail below. Based on the determination of the encryption event, the media device may terminate the presentation of decrypted content.

In some implementations, the media device includes one or more location sensors configured to generate location data. The location data may include geolocation data which is indicative of a latitude and longitude of the media device. The location sensor may also determine the location of the media device using an inertial navigation system, dead-reckoning navigation system, or other techniques.

The media device may receive the encrypted content before determining the location-based decryption event. In other implementations, the media device receives the encrypted content after determining the location-based decryption event.

In some implementations, the media device receives at least one annotation (e.g., a note or a comment) associated with the decrypted content. In some implementations, after the determination of the encryption event, the media device encrypts any annotation received.

An information processing system (e.g., a server) may be configured to receive a request for encrypted content and transmit, to the media device, at least a portion of the encrypted content. In some implementations, based on a determination of a location-based decryption event, the information processing system transmits, to the media device, a cryptographic key which is used to decrypt encrypted content. In some implementations, the information processing system operates with an input device to enable a user to designate the reference object.

Illustrative System

FIG. 1 is a block diagram of a system 100 for decrypting content based on the location of the media device. The system 100 includes a first media device 102(1), a second media device 102(2) and a server 104 which are communicatively coupled using one or more networks 106. In this illustration, two media devices 102(1)-(2) and two users 108(1)-(2) are shown. In other implementations, more than two media devices such as 102(1), 102(2), 102(3), . . . , 102(D) and more than two users 108(1), 108(2), 108(3), . . . , 108(U) may be present. In this example, the first and the second media devices 102(1) and 102(2) are similar in construction, components, modules, and so forth. However, in other situations the media devices 102(1) and 102(2) may differ from one another.

The media devices 102(D) are configured to present, store, manipulate, or otherwise participate in the consumption of content. The media devices 102(D) may include a variety of devices, such as a mobile digital device, a smartphone, a tablet computer, a desktop computer, a laptop computer, a television, an electronic book ("eBook") reader, a gaming console, a set-top box, a media player, an in-vehicle communication system, and so forth. In some implementations, the media devices 102(D) may be referred to as an information processing system or an information processing device. The media devices 102(D) are discussed in more detail below with regard to FIG. 4.

The network 106 facilitating communication between the media devices 102(D) and the server 104 may include a variety of networks, such as a local network, a wide area network ("WAN"), broadcast network, a personal area network, a wired and wireless local area network ("LAN"), and so forth. In some implementations, the network 106 includes at least one of Bluetooth as promulgated by the Bluetooth Special Interest Group, Ethernet, Wi-Fi as promulgated by the Wi-Fi Alliance, 3G and 4G, and so forth. The devices and systems described herein may be configured to directly connect to each other. The system 100 may include additional servers which communicate with the media devices 102(1)-(2) and the server 104.

The server 104 may communicate with a large number of the media devices 102(D). Accordingly, the server 104 may be a high end computer with large storage capacity, fast microprocessors and high speed network connections. Conversely, relative to a typical server, each media device 102(D) may have less storage capacity, processors and network connections. In some implementations, the server 104 may be referred to as an information processing system or an information processing device. The server 104 is discussed in more detail below with regard to FIG. 5.

Referring to FIG. 1, the server 104 transmits encrypted content 110 to the first media device 102(1) and the second media device 102(2). The transmission of the encrypted content 110 may be initiated by the media devices 102(D), the server 104, or another device. For example, where a meeting is scheduled to occur in the future, a user 108 (such as an administrator) may direct the server 104 to deploy encrypted content to the media devices 102(1) and 102(2) before the scheduled meeting. The users 108(1) and 108(2) are unable to decrypt the encrypted content 110 without a cryptographic key 112, preventing access. In this example, the first media device 102(1) and the second media device 102(2) receive and store the encrypted content 110 from the server 104. The first media device 102(1) receives a request from the first user 108(1) to access the encrypted content 110 which is stored by the first media device 102(1).

Based on the received request from the first user 108(1), a location determination module 114 determines a location of the first media device 102(1) by generating location data indicative of the position of the first media device 102(1). In this example, the location determination module 114 determines that the first media device 102(1) is located within the location 116(1).

The location determination module 114 may be configured to determine the location of the media device based on one or more systems. These systems may include an inertial navigation system, dead reckoning navigation systems, satellite-based navigation, network positioning, tags and so forth.

The inertial navigation system may employ sensors such as acceleration sensors, motion sensors and rotation sensors to calculate the position of the media device based on integration of these motions relative to a reference point. The dead reckoning navigation system may determine the location of the media device by integrating compass headings and estimated stride lengths of the user to determine displacement from a reference point. The satellite-based navigation system may use signals provided at least in part by orbital satellites to generate the location of the receiver which may be in the media device. Network positioning may involve interrogating one or more cellular network access points to determine position based at least in part on radio frequency signal strength, association of a network address or access point with a previously determined location, and so forth.

The location determination module 114 may also determine the location of the media device by receiving information from one or more location tags in the environment which are indicative of the location of the media device. Location tags may include radio-frequency identification ("RFID"), optical code tags, near field communication ("NFC") tags, acoustic tags, and so forth.

The location determination module 114 provides data indicative of the location of the media device. For example, the data may include geolocation data such as latitude and longitude of the media device 102, a street address, room designation, and so forth.

In one implementation, based on the location of the first media device 102(1), a location-based decryption event module 118 determines an occurrence of a location-based decryption event. In this implementation, the location-based decryption event includes the media device being located within a predetermined or an authorized location. In this example, because the first media device 102(1) is located in the location 116(1) which has been previously authorized to allow for decryption of the encrypted content 110, the location-based decryption event module 118 determines an occurrence of the location-based decryption event.

In some implementations, the server 104 enables an administrator or other user to designate at least one authorized location 116(1). The location may be authorized for one or more pieces of the encrypted content 110. The authorized location 116(1) may include any suitable location, such as a portion of space within a building or other structure. The location may or may not be separated by walls or partitions from other parts. The authorized location 116(1) may include an area defined by one or more points specified by latitude and longitude, relative position, and so forth.

Based on the occurrence of the location-based decryption event, the first media device 102(1) transmits, to the server 104, a request for the cryptographic key 112 which may be used to decrypt the encrypted content 110 at the authorized location 116(1).

Based on the transmitted request for the cryptographic key 112, a cryptographic key generation module 120 generates or retrieves the cryptographic key 112. In some implementations, the cryptographic key generation module 120 generates the cryptographic key 112 using a random or pseudo-random number generator. In different implementations, the generation of the cryptographic key 112 is predetermined, randomly determined, determined based on an algorithm, or determined based on any other suitable method or criteria. In some implementations, the cryptographic key 112 is already generated. The server 104 may be configured to select and transmit the previously generated cryptographic key 112 to the media device 102.

The cryptographic key 112 may include any suitable type of key. The cryptographic key 112 may be described as data that is applied to a string or a block of data to decrypt encrypted data. In some implementations, the cryptographic key 112 is applied to a string or block of unencrypted data to encrypt the content. The cryptographic key 112 may also be configured to be based, at least in part, on information from the location determination module 114. For example, the cryptographic key 112 may use information received from one or more Global Positioning System satellites. The cryptographic key 112 may include a shared key, a public/private key, and so forth. The cryptographic key 112 may be configured to be valid for a limited period of time or for a limited scope of use.

Referring to FIG. 1, the server 104 transmits the generated cryptographic key 112 to the first media device 102(1). The first media device 102(1) receives the cryptographic key 112. Based on the received cryptographic key 112, a decryption module 122 decrypts the encrypted content 110. A presentation module 124 presents the decrypted content. For example, "ABC" is presented to the user 108(1) visually with a display device of the first media device 102(1).

An encryption event module 126 is configured to determine an occurrence of an encryption event. Based on the occurrence of the encryption event, the presentation module 124 is configured to terminate the presentation of the decrypted content. For example, if the user 108(1) moves the first media device 102(1) outside the authorized location 116(1), an encryption event occurs and the presentation module 124 may terminate the presentation of decrypted content. Other encryption events are discussed below.

The termination of the presentation of the decrypted content in response to the occurrence of the encryption event may help deter an adversarial user from compromising content such as confidential data. That is, after the occurrence of the encryption event, the user does not have decrypted access to the content, and therefore is prevented from compromising the content.

In this implementation, based on the determination of the encryption event, an encryption module 128 is configured to re-encrypt the decrypted content. In another implementation, the encryption module 128 does not re-encrypt the decrypted content. In this implementation, the first media device 102(1) is configured to terminate access to the cryptographic key 112 which is being used to decrypt the encrypted content 110. Thus, the user would be unable to access any content which was previously encrypted.

Referring to FIG. 1, the second user 108(2) has entered the location 116(2) with the second media device 102(2). The location 116(2) is not authorized for decryption of the encrypted content 110. Because the second media device 102(2) is outside the authorized location 116(1), the second media device 102(2) is unable to access the cryptographic key 112 and therefore the second media device 102(2) cannot present decrypted content. In this example, the second media device 102(2) visually displays "X" to the user 108(2) which indicates that the second media device 102(2) is unable to display the encrypted content 110.

FIG. 1 illustrates a fixed point in time. In the example illustrated in FIG. 1, if the first media device 102(1) exits the authorized location 116(1), the encryption event occurs and the first media device 102(1) terminates the display of the decrypted content. If the second media device 102(2) enters the authorized location 116(2), the location-based decryption event occurs. Based on this location-based decryption event, the second media device 102(2) receives the cryptographic key 112 and displays the decrypted content.

Figure 2:
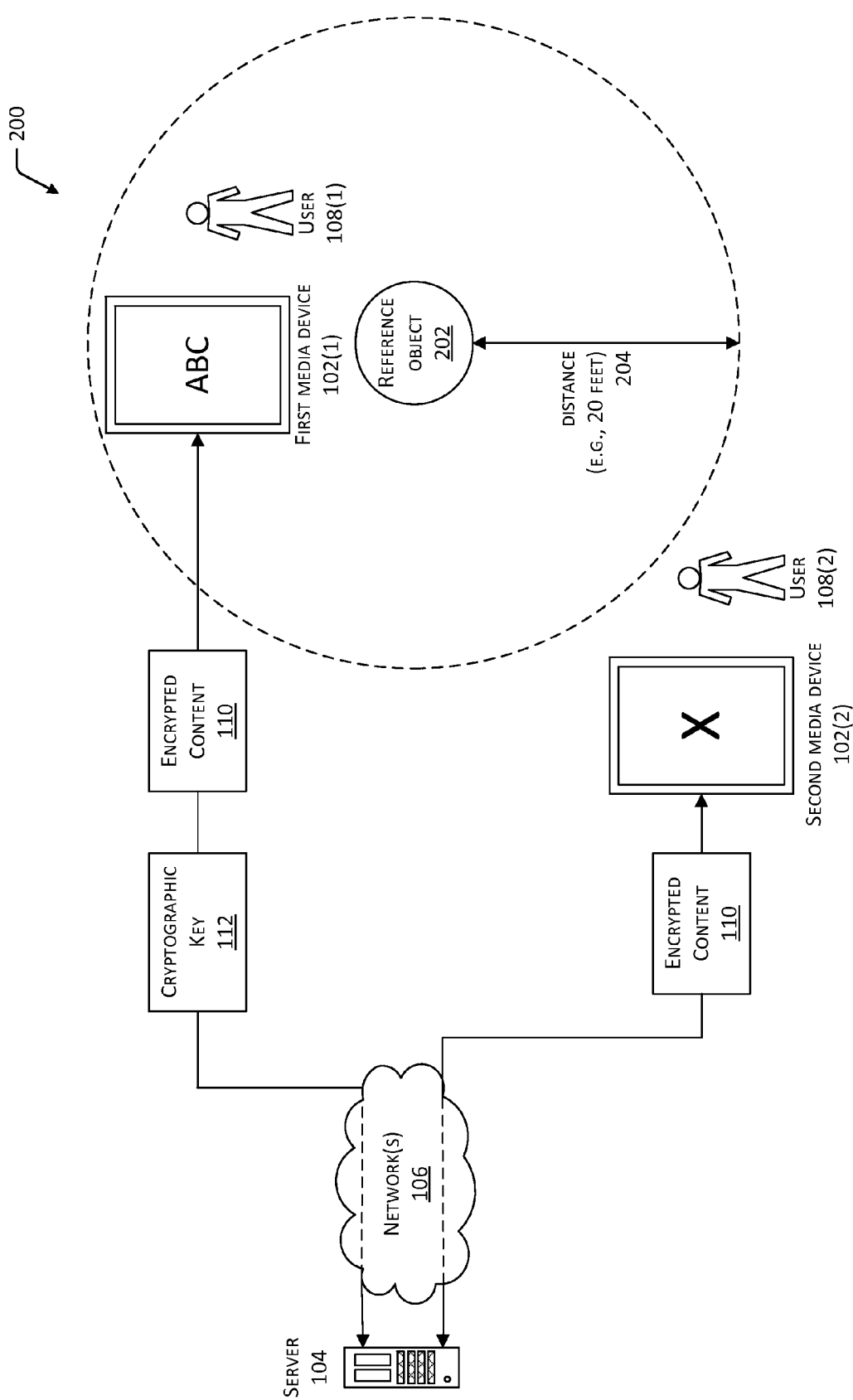
FIG. 2 is a block diagram of a system for decrypting content based on the location of the media device, illustrating the location-based decryption event including the media device located within a predetermined distance of a designated reference object.

FIG. 2 is a block diagram of a system 200 for decrypting content based on the location of the media device 102(1), illustrating the location-based decryption event including the media device 102(1) located within a predetermined distance of a designated reference object 202.

In this implementation, the system 200 includes a reference object 202. The reference object 202 is configured to provide a physical item with which a location-based decryption event may be associated. For example, the reference object 202 may include at least one of a communication device, a server, a radio frequency identification tag, a near field communication tag, optical code, another media device or other device or artifact. The reference object 202 may be a portable device in that it may move from one location to another. In some implementations, the reference object 202 acts as the server 104. For example, the reference object 202 may include the processes and modules of the server 104 that are described herein.

The server 104 may use the reference object 202 to transmit at least one of the encrypted content 110 and the cryptographic key 112. Based on a determination of an occurrence of the location-based decryption event, the media device 102 may transmit a request for the cryptographic key 112 to the reference object 202 which then transmits the request for the cryptographic key 112 to the server 104. Thereafter, the server 104 may transmit the cryptographic key 112 to the reference object 202 which then transmits the cryptographic key 112 to the media device.

In one implementation, a device designated at the reference object 202 may be configured to present on a display a series of optical codes, such as two-dimensional barcodes. The media device may be equipped with cameras configured to detect these optical codes and use the data to determine the location-based decryption event.

In this implementation, the location-based decryption event includes the first media device 102(1) being within a predetermined distance 204 from the designated reference object 202. The predetermined distance 204 from the designated reference object 202 may be specified by an administrator, have a default value, and so forth. For example, the predetermined distance 204 may be twenty feet. Accordingly, in this example, the first media device 102(1) determines an occurrence of the location-based encryption event based on the media device 102(1) being located within twenty feet of the designated reference object 202. In another example, the reference object 202 may determine an occurrence of the location-based encryption event based on the media device being located within the predetermined distance 204. The reference object 202 may include the location-based determination module 114. In implementations where the location information is provided by the reference object 202 or another device, the media device may omit the location-based determination module 114.

Based on the occurrence of the location-based decryption event, the first media device 102(1) requests the cryptographic key 112. The server 104 may verify the information in the location-based decryption event, such as the position of the first media device 102(1). As illustrated in FIG. 2, the server 104 transmits the cryptographic key 112 to the first media device 102(1) and the first media device 102(1) receives the cryptographic key 112.

In this implementation, based on the cryptographic key 112, the first media device 102(1) decrypts the encrypted content 110. As illustrated in FIG. 2, the first media device 102(1) displays the decrypted content. For example, the decrypted content "ABC" is presented to the user 108(1) visually in the display device of the first media device 102(1).

In this implementation, the encryption event module 126 of the first media device 102(1) is configured to determine an occurrence of the encryption event. In this implementation, the encryption event includes determining that the first media device 102(1) is not located within the predetermined distance 204 of the designated reference object 202. For example, in this implementation, if the user 108(1) were to move the first media device 102(1) beyond the predetermined distance from the reference object 202, the encryption event module 126 would determine an occurrence of the encryption event.

Referring to FIG. 2, the second user 108(2) has not brought the second media device 102(2) within the predetermined distance 204 of the designated reference object 202. Because the second media device 102(2) is not located within the predetermined distance 204 of the designated reference object 202, the second media device 102(2) is unable to access the cryptographic key 112 and therefore the second media device 102(2) cannot present the decrypted content. In this example, the second media device 102(2) visually displays "X" to the user 108(2) which indicates that the second media device 102(2) is unable to display the encrypted content 110.

As above, FIG. 2 is illustrated at a fixed point in time. In this example, if the first media device 102(1) is carried away from the predetermined distance 204, the first media device 102(1) terminates the display of the decrypted content. Similarly, when the second media device 102(2) is carried within the predetermined distance 204, the location-based decryption event occurs, and the second media device 102(2) receives the cryptographic key 112 and displays the decrypted content.

Figure 3:
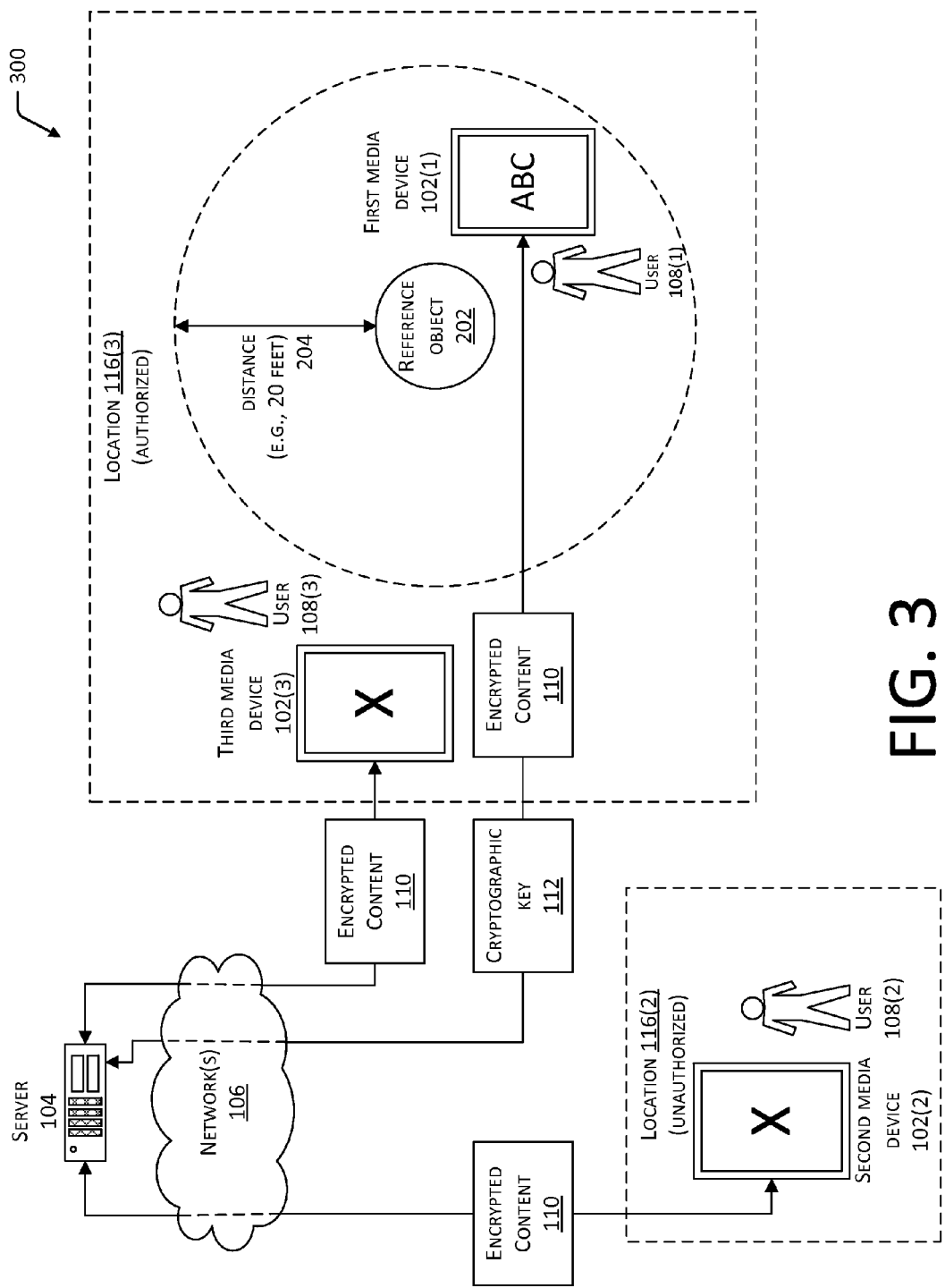
FIG. 3 is a block diagram of a system for decrypting content based on the location of the media device, illustrating the location-based decryption event including: (a) the media device located within a predetermined geolocation; and (b) the media device located within a predetermined distance of a designated reference object.

FIG. 3 is a block diagram of a system 300 for decrypting content based on the location of a media device. Illustrated here is the location-based decryption event which includes a media device being located within a predetermined geolocation and within a predetermined distance 204 of the designated reference object 202.

As shown here, the first media device 102(1) is located in an authorized location 116(3) which also includes the reference object 202. The first media device 102(1) is within a predetermined distance 204 of the designated reference object 202. Accordingly, the first media device 102(1) determines an occurrence of the location-based decryption event.

Based on the occurrence of the location-based decryption event, the first media device 102(1) requests the cryptographic key 112. As illustrated in FIG. 3, the server 104 transmits the cryptographic key 112 to the first media device 102(1) which receives the cryptographic key 112. The decryption module 122 uses the cryptographic key 112 to decrypt at least a portion of the encrypted content 110 and present the decrypted portion. For example, the presentation module 124 may present "ABC" on the display device of the first media device 102(1).

In this example, the second media device 102(2) is unable to access the cryptographic key 112 because the second media device 102(2) is outside of the authorized location 116(3), and beyond the predetermined distance 204 of the designated reference object 202.

Continuing the example, the third media device 102(3) is unable to access the cryptographic key 112 because, although the third media device 102(3) is located within the authorized location 116(3), the third media device 102(3) is beyond the predetermined distance 204 associated with the designated reference object 202. The reference object 202 may be configured to determine its own location. When the media device requests the content or the cryptographic key 112, the server 104 may use the location of the reference object 202 as verification that the media device is located within the authorized location 116(3). In one example, the media device omits the location determination module 114 and the reference object 202 includes the location determination module 114. The server 104 may use the location information determined by the reference object 202 to determine the occurrence of the location-based decryption event.

Figure 4:
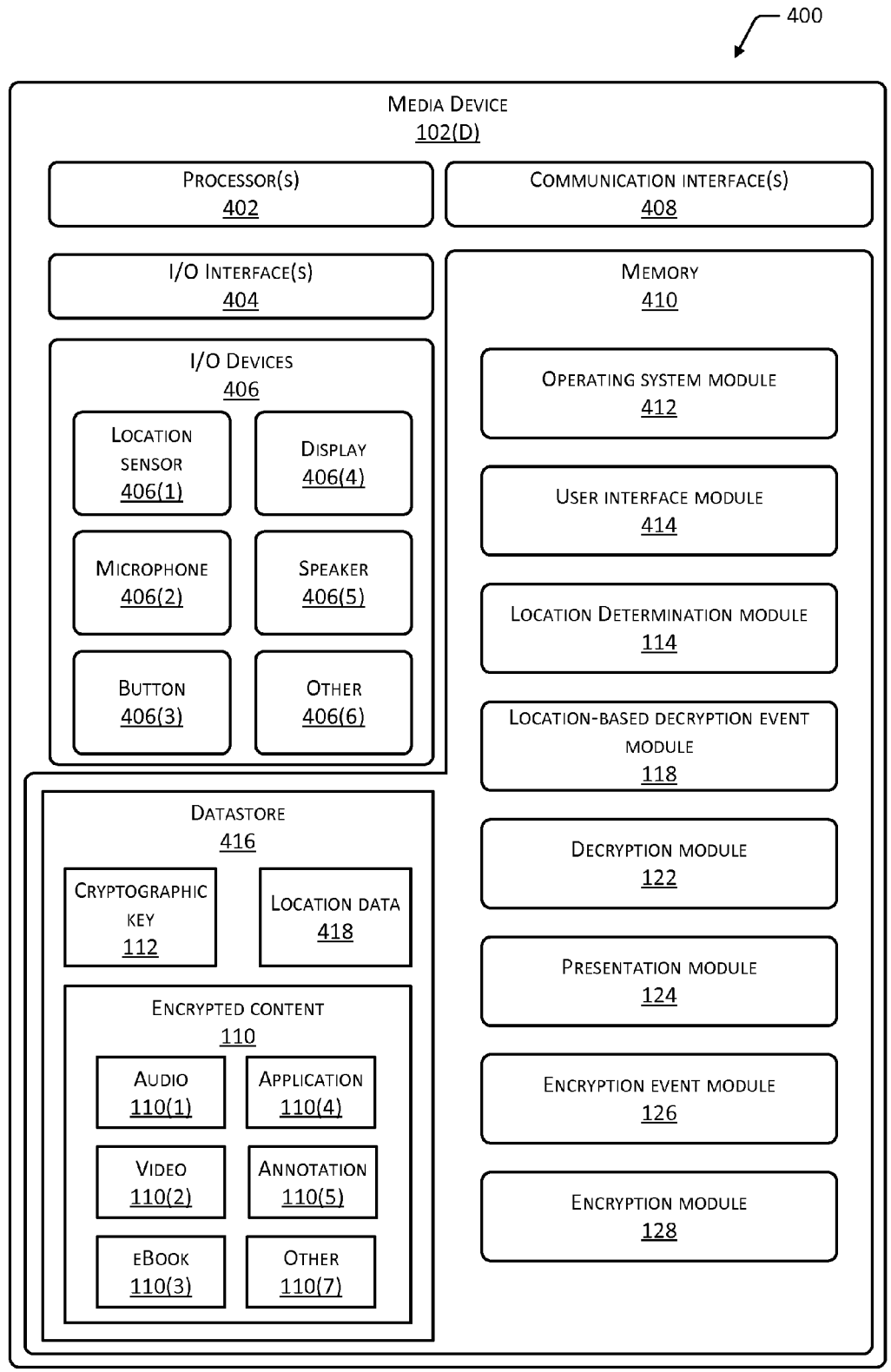
FIG. 4 is a block diagram of the media device configured to decrypt content based on location.

FIG. 4 is a block diagram 400 of the media device 102(D) which is configured to control access to encrypted content 110 based at least in part on location. The media device may include at least one processor 402 configured to execute stored instructions. The at least one processor 402 may comprise one or more cores.

The media device includes at least one input/output ("I/O") interface 404 which enables portions of the media device (e.g., the processor 402) to communicate with other devices. The I/O interface 404 may include inter-integrated circuit ("I2C"), serial peripheral interface bus ("SPI"), USB, RS-232, HDMI, TOSLINK, Bluetooth, and so forth. The at least one I/O interface 404 may be communicatively coupled to at least one I/O device 406. In some implementations, certain I/O devices 406 are physically incorporated with the media device 102 or externally placed.

As illustrated in FIG. 4, the at least one I/O device 406 may include one or more input devices such as location sensors 406(1), a microphone 406(2), and a button 406(3). The location sensor 406(1) may include an inertial navigation system, dead-reckoning navigation system, network positioning system, radio position finding system, satellite-based navigation system, an accelerometer system, a gyroscope system, and so forth. The satellite-based system may include one or more of a Global Positioning System receiver, a GLONASS receiver, a Galileo receiver, an Indian Regional Navigational Satellite System, and so forth. The I/O device 406 may include one or more of a variety of output devices such as a display 406(4), a speaker 406(5) and other I/O devices 406(6). The one or more display devices 406(4) may include electrophoretic displays, liquid crystal displays, interferometric displays, cholesteric displays, light emitting diode displays, projection displays, and so forth. The other I/O devices 406(6) may include any of the following: a camera, a touch sensor and a haptic output device.

The media device may include at least one communication interface 408. The communication interface 408 may be configured to provide communications between the media device and other devices, such as the server 104, routers, access points, other servers, and so forth. The communication interface 408 may connect to the network 106.

The media device may include at least one bus or other internal communications hardware or software that enables for the transfer of data between the various modules and components of the media device.

As illustrated in FIG. 4, the media device may include at least one memory or memory device 410. The memory 410 may include at least one computer-readable storage media ("CRSM"). The CRSM may include at least one of an electronic storage medium, a magnetic storage medium, an optical storage medium, a quantum storage medium, or a mechanical computer storage medium. The memory 410 may include computer readable instructions, data structures, program modules and other data for the operation of the media device.

The memory 410 may include at least one operating system ("OS") module 412. The OS module 412 may be configured to manage hardware resources such the I/O interface 404, the I/O device 406, the communication interface 408, and provide various services to applications or modules executing on the processor 402. The memory 410 may also store at least one of the following modules which may be executed as foreground applications, background tasks, daemons, and so forth.

In some implementations, a user interface module 414 is configured to provide a user interface to the user using the I/O devices 406 and to accept inputs received from the I/O devices 406. The user interface may include one or more visual, audible, or haptic elements. For example, the user interface may be configured to provide a graphic user interface, an audible user interface, and so forth.

The location determination module 114 is configured to provide location data of the media device based at least in part on information received from the one or more location sensors 406(1). The location data may include any suitable data indicative of the location of the media device. The location data may include geolocation data which is indicative of the latitude and longitude of the media device, relative position such as "conference hall A", and so forth.

The location-based decryption event module 118 determines an occurrence of the location-based decryption event. As discussed above, the location-based decryption event may include the media device being located within the authorized location 116(1), within the predetermined distance 204 of the designated reference object 202, or a combination thereof.

The location-based decryption event may be based on a change in a connection state of the media device. This connection state may be between the media device and the designated reference object 202. For example, when the media device comes within radio communication range of a radio of the designated reference object 202, the media device may change from a disconnected state to a connected state. Based on the state of the connection, the location-based decryption event module 118 determines an occurrence of the location-based decryption event. The connection may be initiated manually, or occur automatically without intervention by the user.

In some implementations, the location-based decryption event further includes the media device receiving an authorized password in addition to presence at the authorized location 116(1), within the predetermined distance 204 of the designated reference object 202, or a combination thereof. For example, the user may enter into an authorized location with the media device. The media device may prompt the user to enter a password to receive access to the cryptographic key 112 and the encrypted content 110.

The location-based decryption event may include the media device having an authorized identification number. In addition to determining whether the media device is located in the authorized location 116(1), within the predetermined distance 204, or both, the server 104 may also determine whether the media device is an authorized media device based on an identification number associated with, and stored by, the media device. The identification number may be based at least in part on a media access control address, serial number, network identification number, and so forth. For example, the device serial number may be hashed, and the hash may be provided to the server 104. The server 104 may determine the identification number is authorized based on comparison with a previously stored list of identification numbers stored by the server, cryptographic inspection, and so forth.

As discussed above, based on the occurrence of the location-based decryption event, the decryption module 122 decrypts at least a portion of the encrypted content 110 using the cryptographic key 112. For example, the decryption module 122 may convert unintelligible ciphertext back to plaintext.

The presentation module 124 is configured to present decrypted content. The presentation module 124 may be configured to present the decrypted content using one or more of the display device 406(4), the speaker 406(5), and so forth.

As discussed above, in some implementations, the encryption event module 126 may determine occurrence of the encryption event. The encryption event may include occurrence of a variety of different conditions. For example, the encryption event may be based at least in part on a change in a connection state of the media device with the designated reference object 202. The encryption event may be based on whether the media device can connect to a signal of the reference object 204. For example, loss of signal with the reference object 204 may result in the encryption event. When the media device connects to the signal of the reference object 204, the media device may determine the location-based decryption event.

In some implementations, the encryption event includes an elapsed amount of time. For example, the encryption event may include an expiration of the cryptographic key 112. For example, the cryptographic key 112 may be associated with an amount of time for which the cryptographic key 112 is valid. In one example, the media device is configured to present decrypted content for the amount of time for which the cryptographic key 112 is valid. Once the cryptographic key 112 becomes invalid, the media device may no longer present the decrypted content. The media device may be configured to transmit a request for another cryptographic key 112 once the cryptographic key 112 is invalid. As described above, the encryption event may include a change in the location of the media device.

In some implementations, the location-based decryption event and the encryption event are based on a time window. For example, the time window may begin at a first time (e.g., 2:00 p.m.) and end at a second time (e.g., 5:00 p.m.). For example, the reference object 202 may transmit the cryptographic key 112 to the media device only on or after 2:00 p.m. However, at 5:00 p.m., the reference object 202 may terminate access to the cryptographic key 112. The reference object 202 may be configured to enable the user to select or set the begin time and the end time of the time window.

Based on the determination of the encryption event, the encryption module 128 is configured to terminate presentation of the decrypted content by the media device. In some implementations, based on the occurrence of the encryption event, the encryption module 128 re-encrypts the decrypted content.

In some implementations, the memory 410 includes a datastore 416 for storing information. The datastore 416 may use a flat file, database, linked list, tree or other data structure to store the information. In some implementations, the datastore 416, or a portion thereof, may be distributed across at least one other device, such as a server, a network storage device, and so forth. As illustrated in FIG. 4, the datastore 416 may include the cryptographic key 112, the location data 418 and the encrypted content 110.

As discussed above, the cryptographic key 112 may include any suitable type of key. The cryptographic key 112 may be described as data that is applied to a string or a block of data to encrypt or decrypt encrypted data. The cryptographic key 112 may include a shared key, a public/private key, and so forth. The cryptographic key 112 may be configured to be valid for a limited period of time or for a limited scope of use. For example, the cryptographic key 112 may be associated with a particular piece of encrypted content 110.

As discussed above, the location data 418 may include any suitable data indicative of a location. For example, the location data 418 may include geolocation data which is indicative of the latitude and longitude of the media device.

As illustrated in FIG. 4, the encrypted content 110 may include a variety of different types of data. The encrypted content 110 may include audio data 110(1), video data 110(2), eBook data 110(3), application data 110(4), annotation data 110(5), and other data 110(6). Content may be downloaded or streamed from the server 104 to the media device.

The encrypted application data 110(4) may include certain functions of an application or program. In one example, the user is unable to perform certain functions of an application unless the user enters the authorized location 116(1) with the media device. That is, based on the media device being located in the authorized location 116(1), the media device accesses a cryptographic key 112 used to decrypt an encrypted function of an application.

The content disclosed herein may be stored in its entirety or a portion. For example, the media device may stream content from the server 104, such that, at any given time, only a portion of decrypted content is stored within the memory 410.

In some implementations, the media device includes a chassis configured to mechanically support at least one of the processor 402, the I/O interfaces 404, the I/O devices 406, the communication interface 408 or the memory 410.

Figure 5:
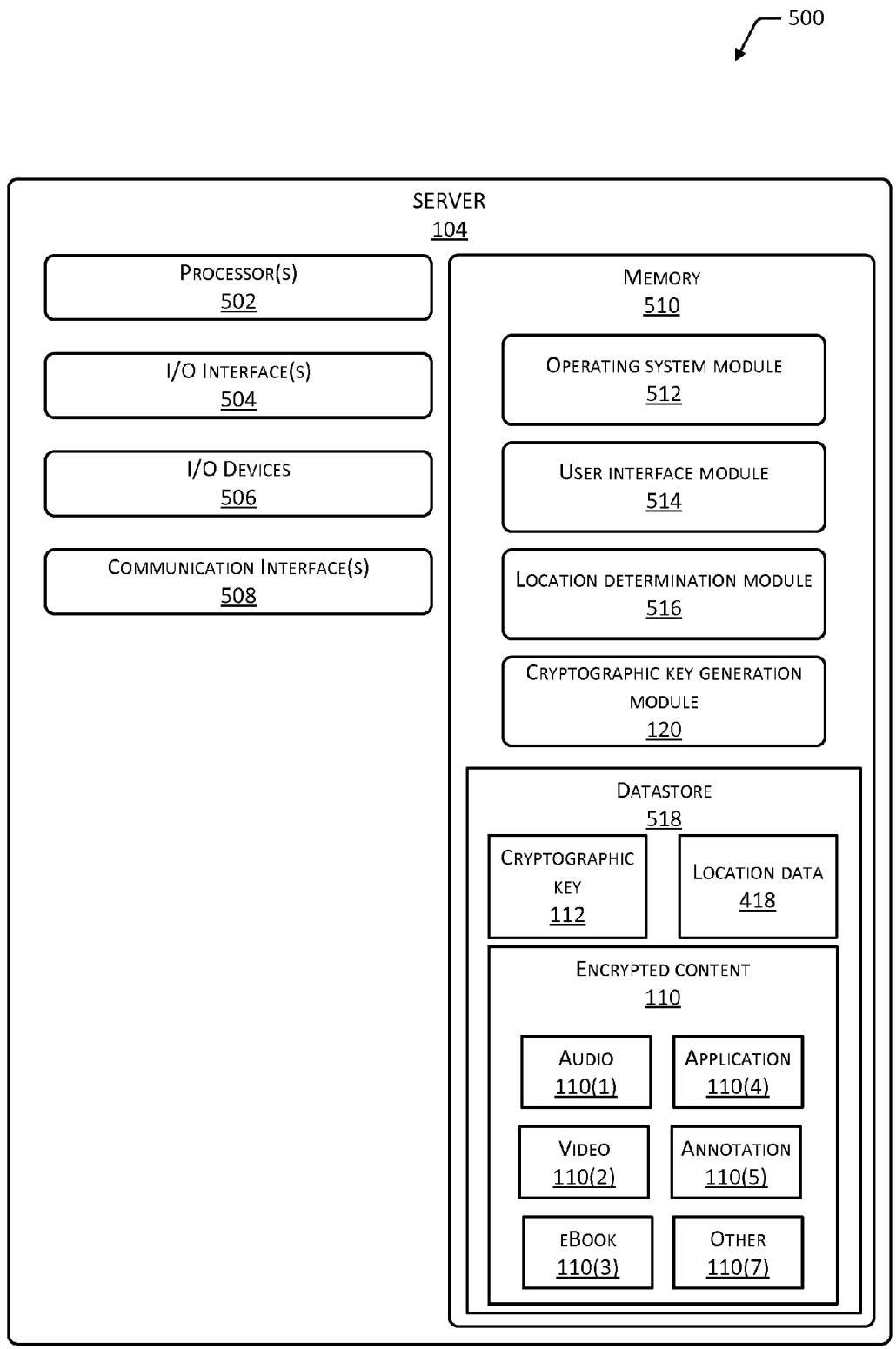
FIG. 5 is a block diagram of a server configured to transmit a cryptographic key based on a location-based decryption event.

FIG. 5 is a block diagram 500 of the server 104 which is configured to transmit the cryptographic key 112 based on the location-based decryption event. The server 104 may include at least one processor 502 configured to execute stored instructions. The at least one processor 402 may comprise one or more cores. The server 104 includes at least one I/O interface 504 which enable portions of the server 104 (e.g., the processor 502) to communicate with other devices. I/O interface 504 may include I2C, SPI, USB, RS-232, IEEE 1394, Bluetooth, and so forth.

The at least one I/O interface 504 is communicatively coupled to at least one I/O device 506. In some implementations, certain I/O devices 506 are physically incorporated with the server 104 or externally placed. The at least one I/O device 506 may include a variety of input devices such as external storage, environmental sensors, keyboards, and so forth. The I/O device 506 may include a variety of output devices such as a display, printer, and so forth.

The server 104 includes at least one communication interface 508. The communication interface 508 may be configured to provide communications between the server 104 and other devices, such as the media device, routers, access points, other servers, and so forth. The communication interface 508 may connect to the network 106.

The server 104 may include at least one bus or other internal communications hardware or software that enables for the transfer or data between the various modules and components of the server 104.

As illustrated in FIG. 5, the server 104 may include at least one memory or memory device 510. The memory 510 may include at least one CRSM. The memory 510 may include computer readable instructions, data structures, program modules and other data for the operation of the server 104.

The memory 510 may include at least one OS module 512. The OS module 512 may be configured to manage hardware resources such the I/O interface 504, the I/O device 506, the communication interface 508, and provide various services to applications or modules executing on the processor 502. The memory 510 may also store at least one of the following modules which may be executed as foreground applications, background tasks, daemons, and so forth.

A user interface module 514 is configured to provide a user interface to the user 108 using the I/O devices 506 and to accept inputs received from the I/O devices 506. For example, the user interface module 514 may provide a web interface allowing users to specify locations which are authorized for particular piece of encrypted content 110. In another example, user interface module 514 may enable the user 108 having administrative privileges to designate or select the reference object 202 from a list of different reference objects. In some implementations the user interface module 514 may provide an application programming interface ("API").

A location determination module 516 may also be stored in the memory 510 and is configured to determine the location of the media device. The location determination module 516 may be configured to determine location using network positioning services or facilities. For example, the server 104 may query a cellular data carrier to provide positioning information for the media device based on time-difference-of-arrival data to several cellular radio sites. The location determination module 516 may also receive information from data networks or third-party providers which associate a particular network address to a particular location. For example, the internet protocol address of 206.33.56.105, a media access control address 04:00:12:03:11:A1 of a wireless access point, or both may be associated with the street address of 935 Pennsylvania Avenue Northwest in Washington, D.C.

The location determined by the location determination module 516 may be used instead of, or in addition to, the location information provided by the location determination module 114 of the media device. In some implementations where the media device omits the location determination module 114, information from the location determination module 516 may be used to determine the location-based decryption event or the encryption event.

The memory 510 may also store the cryptographic key generation module 120 which is configured to generate the cryptographic key 112. The cryptographic key generation module 120 may generate the cryptographic key 112 using a random or pseudo-random number generator. In other implementation, the generation of the cryptographic key 112 is predetermined, randomly determined, determined based on an algorithm, and so forth.

The cryptographic key 112 may be generated based on location. In one example where the distance 204 may reach a plurality of different locations (e.g., different rooms), the cryptographic key generation module 120 may generate different cryptographic keys 112 for different authorized locations.

The memory 510 includes a datastore 518 for storing information. The datastore 518 may use a flat file, database, linked list, tree or other data structure to store the information. In some implementations, the datastore 518, or a portion thereof, may be distributed across at least one other device, such as a server, a network storage device, and so forth. As illustrated in FIG. 5, the datastore 518 may include the cryptographic key 112, the location data 418, the encrypted content 110, and so forth.

The cryptographic key 112 may be transferred using any suitable method. In some implementations, the cryptographic key 112 is transferred to the media device 102 using radio frequency transmission, optical transmission, electrical signals, and so forth. The cryptographic key 112 may be transmitted to the media device 102 from any suitable source. For example, the cryptographic key 112 may be transmitted from the server 104, from a caching server, and so forth.

As described above, the location data 418 may include data indicative of a location. For example, in one implementation, the location data 418 includes geolocation data which is indicative of the latitude and longitude of the media device.

As illustrated in FIG. 5 and described above, the encrypted content 110 may include a variety of different types of encrypted data. In this implementation, the encrypted content 110 may include audio data 110(1), video data 110(2), eBook data 110(3), application data 110(4), annotation data 110(5) and other data 110(6). Content may be downloaded or streamed from the server 104 to the media device.

Although the above has been shown using the media device and the server 104, there can be many alternatives, modifications and variations. For example, some of the modules of the server 104 may be expanded or combined. In another example, one of the media devices may be configured to act as the server 104 for other media devices. Further, in some implementations, the functions provided by certain modules may be employed by a separate information processing system operated by a separate entity.

Illustrative Scenarios and Processes

Figure 6:
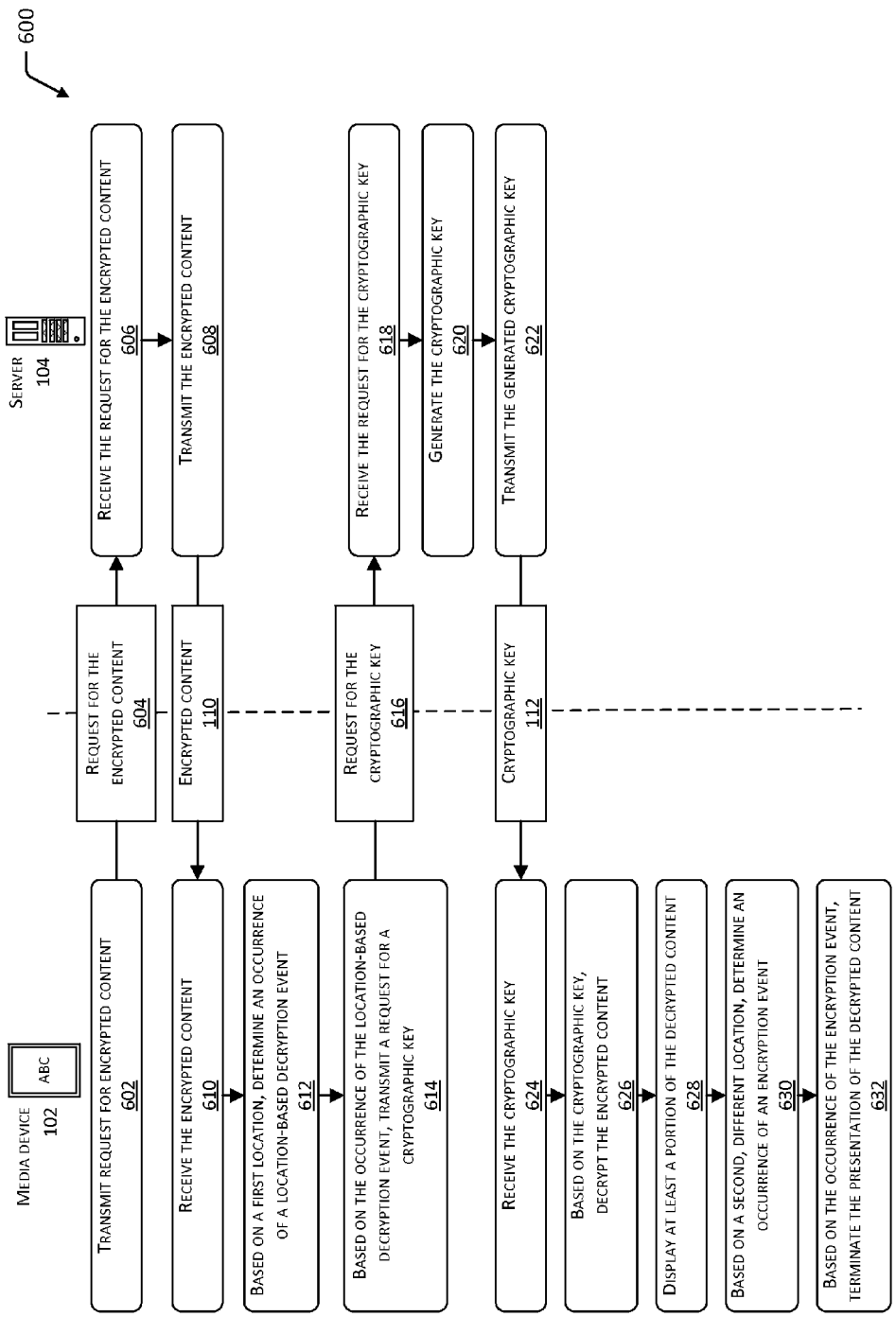
FIG. 6 is a flowchart illustrating a process of decrypting content based on a location-based decryption event, using the media device and the server.

FIG. 6 is a flowchart illustrating a process 600 of decrypting content based on the location-based decryption event, using the media device and the server 104. The process 600 may be implemented by one or more of the media devices, the server 104 or the reference object 202. Although the process 600 is described with reference to the flowchart illustrated in FIG. 6, many other methods performing the acts associated with the process 600 may be used. For example, the order of many of the steps may be changed, some of the steps described may be optional, and additional steps may be included. As shown in FIG. 6, data may flow between the media device and the server 104.

The media device at block 602 transmits a request for encrypted content 604. For example, the user may request encrypted content 110 associated with a meeting which is scheduled soon. As described above, in some implementations, the media device transmits the request for encrypted content to the reference object 202.

At block 606, the server 104 receives the request for the encrypted content 110. At block 608, the server 104 transmits at least a portion of the encrypted content 110. As described above, in some implementations, the reference object 202 may transmit the encrypted content 110. The server 104 may be configured to transmit at least a portion of the encrypted content 110 after an occurrence of the location-based decryption event.

At block 610 the media device receives the encrypted content 110. Because the encrypted content 110 is encrypted, and the media device does not have the proper cryptographic key 112 for decryption, the user is unable to view or otherwise present the content.

As indicated by block 612, based on a first location, the media device determines an occurrence of a location-based decryption event. As discussed above, the location-based decryption event may include a variety of events. For example, the location-based decryption event may include the media device moving into the authorized location 116(1). The location-based decryption event may include the media device being located within a predetermined distance 204 of the designated reference object 202.

The location determination module 114, based in part on information from the one or more location sensors 406(1), generates location data 418. The location data 418 may include first location data and second location data. In this example, the media device may determine a first location of the media device based on the generated first location data 418. The first location data 418 may include geolocation data which is indicative of a latitude and longitude of the media device. Based on that location data 418, the determination of occurrence of the location-based decryption event may be made by the location-based decryption event module 118.

At block 614, based on the occurrence of the location-based decryption event, the media device 102 transmits a request for the cryptographic key 616. Alternatively, based on the occurrence of the location-based decryption event, the server 104 transmits the encrypted content 110. For example, the location determination module 516 may provide the location data 418 which indicates the occurrence of the location-based decryption event and transmission of the cryptographic key 112 without the request 616.

At block 618 the server 104 receives the request for the cryptographic key 616. At block 620, based on the request 616, the server 104 generates the cryptographic key 112. In some implementations, the server 104 may retrieve a previously generated cryptographic key 112. As discussed above, the cryptographic key 112 may be generated using a variety of methods. In some implementations the designated reference object 202 may be configured to generate and transmit the cryptographic key 112.

At block 622, the server 104 transmits the cryptographic key 112. At block 624 the media device receives the cryptographic key 112.

Based on the receipt of the cryptographic key 112, the media device at block 626 decrypts at least a portion of the encrypted content 110. At block 628 the media device displays at least a portion of the decrypted content.

The media device may be a portable device, in that it may be move from one location to another. Following such a change of location, based on a second different location, the media device at block 630 determines an occurrence of an encryption event. As discussed above, the encryption event may include a variety of events. For example, a change in a location of the media device, a change in a connection state of the media device with a designated reference object 202, an elapsed amount of time, the end of a time window, an expiration of the cryptographic key 112, and so forth.

As indicated by block 632, based on the occurrence of the encryption event, the media device terminates the presentation of the decrypted content. In some implementations, based on the occurrence of the encryption event, the media device re-encrypts the decrypted content. The re-encryption may use the cryptographic key 112, or another cryptographic key 112. After the decrypted content is re-encrypted, this content is once again unintelligible to the user.

In other implementations the access by the user to the encrypted content 110 may be terminated in other ways. For example, the encryption event may trigger the media device to enter a locked state requiring a password to unlock. Or the cryptographic key 112 may be erased, revoked, or otherwise be rendered unavailable for use, resulting in the encrypted content 110 remaining encrypted. In some implementations, based on the determination of the encryption event, the decrypted content is deleted from the media device.

As described above, in an alternative implementation the server 102 is configured to determine the occurrence of the location-based decryption event, the encryption event, or both. In this implementation, the sever 104 may transmit the cryptographic key 112 to the media device based on the occurrence of the location-based decryption event. In addition, based on the occurrence of the encryption event, the server 104 may re-encrypt content which has been decrypted, revoke the previously issued cryptographic key 112, suspect streaming of the encrypted content 110, and so forth.

In some implementations, the media device is configured to receive at least one annotation 110(5) associated with the decrypted content. For example, after the media device displays decrypted content (e.g., a spreadsheet), the media device 102 may enable the user to operate with an input device and receive, from the user, the annotation 110(5) associated with the spreadsheet. The annotation 110(5) may include a note or a comment associated with the spreadsheet. Continuing with this example, based on the occurrence of the encryption event, the media device or the server 104 may encrypt the annotation. In another example, the media device does not encrypt the annotation 110(5) based on the encryption event.

The annotation 110(5) may be stored in a variety of different devices. For example, based on the occurrence of the encryption event, the media device may be configured to store the annotation 110(5) in at least one of the media device, the server 104 and the reference object 202. In some implementations where the server 104 or the reference object 202 stores the annotation 110(5), the annotation 110(5) may be shared with a plurality of different users.

Figure 7:
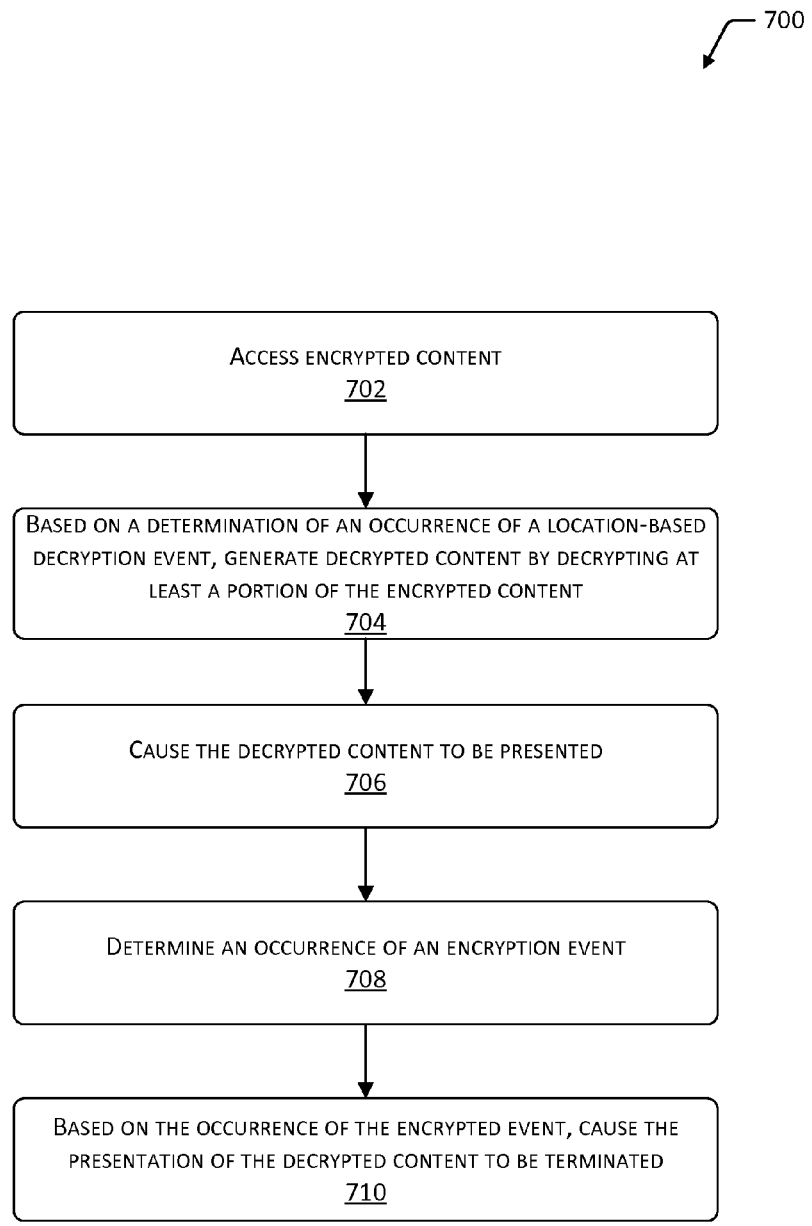
FIG. 7 is a flowchart illustrating a process of decrypting content based on a location-based decryption event.

FIG. 7 is a flowchart illustrating a process 700 of decrypting content based on a location-based decryption event. The process 700 may be implemented by the media device, the server 104, or both. Although the process 700 is described with reference to the flowchart illustrated in FIG. 7, many other methods of performing the acts associated with the process 700 may be used. For example, the order of many of the steps may be changed, some of the steps described may be optional, and additional steps may be included.

At block 702, the encrypted content 110 is accessed. For example, the user may use the media device to request and receive the encrypted content 110 from the server 104.

At block 704, based on a determination of an occurrence of a location-based decryption event, the media device generates decrypted content by decrypting at least a portion of the encrypted content 110. Continuing the example, based on the request for access to the encrypted content 110, the media device may determine a first location (e.g., a room in a building) of the media device. Based on the determined first location, in this example, the media device determines an occurrence of the location-based decryption event. In one example, the location-based decryption event includes presence of the media device at a geolocation which is determined based on a satellite-based navigation system.

In some implementations, the determination of the location-based decryption event includes determining that the media device has received a password from a user input device. That is, in this implementation, in addition to the requirement that the media device must be located at an authorized location, the user must also enter a password before the media device receives the cryptographic key 112. With now at least a portion of the content decrypted, block 706 causes the decrypted portion of the content to be presented. The decrypted portion may be presented using any of the display devices 406(4) or speakers 406(5) or other output devices described above.

At block 708, the media device determines occurrence of an encryption event. In one example, the determination of the occurrence of the encryption event is based on the media device being at a second, different location, such as movement of the media device.

As indicated by block 710, based on the occurrence of the encryption event, the media device causes the decrypted content to be terminated. Based on the occurrence of the encryption event, the media device re-encrypts the decrypted content, revokes the cryptographic key 112, or otherwise terminates access to the content.

Figure 8:
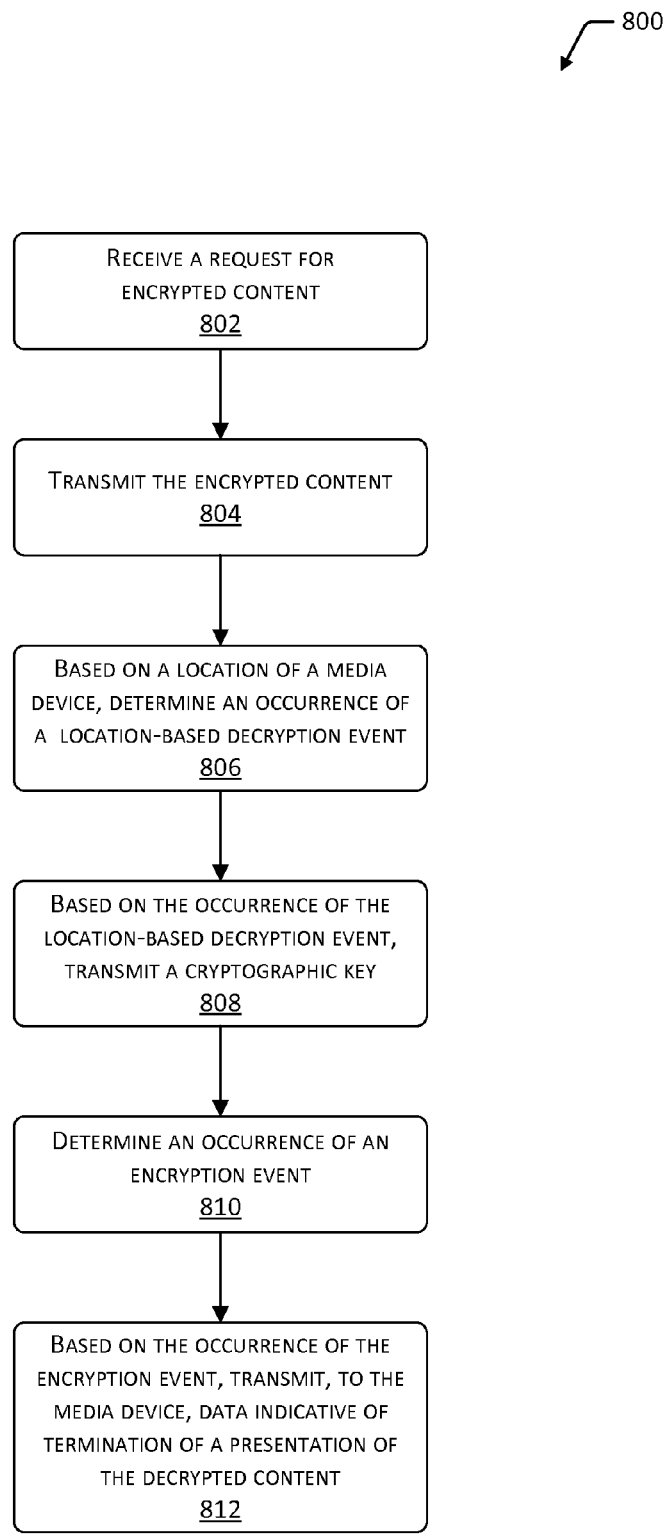
FIG. 8 is a flowchart illustrating a process of decrypting content based on a location-based decryption event, using the server.

FIG. 8 is a flowchart illustrating a process 800 of decrypting content based on a location-based decryption event, using the server 104. The process 600 may be implemented by the media device, the server 104, or both. Although the process 800 is described with reference to the flowchart illustrated in FIG. 8, many other methods of performing the acts associated with the process 800 may be used. For example, the order of many of the steps may be changed, some of the steps described may be optional, and additional steps may be included.

At block 802 a request for encrypted content 110 is received. For example, the user may operate with an input device to request an encrypted file stored in the server 104 be transferred at least in part to the media device. As indicated by block 804, the server 104 transmits the encrypted content 110. The server 104 may transmit the encrypted content 110 in response to the receiving the request for the encrypted content 110.

As indicated by block 806, based on a location of the media device, the server 104 determines an occurrence of a location-based decryption event. For example, the location-based decryption event module 118 may determine the occurrence of the location-based decryption event based on the media device being located within the predetermined distance 204 of the designated reference object 202.

As indicated by block 808, based on the occurrence of the location-based decryption event, the server 104 transmits the cryptographic key 112. Continuing with the example, the cryptographic key generation module 120 may select a stored cryptographic key and transmit the selected cryptographic key using the network 106.

At block 810, the server 104 determines an occurrence of an encryption event. For example, the server 104 may determine the occurrence of the encryption event based on the media device not being located within the predetermined distance 204 of the designated reference object 202. Or the location determination module 516 may provide location data 418 that the media device has moved to the unauthorized location 116(2).

At block 812, based on the occurrence of the encryption event, the server 104 causes the media device to terminate the presentation of decrypted content. For example, content which has been decrypted using the cryptographic key 112 may be re-encrypted using the cryptographic key 112, erased from the memory 410, and so forth. After the decrypted content is re-encrypted, this content is once again unintelligible.

Figure 9:
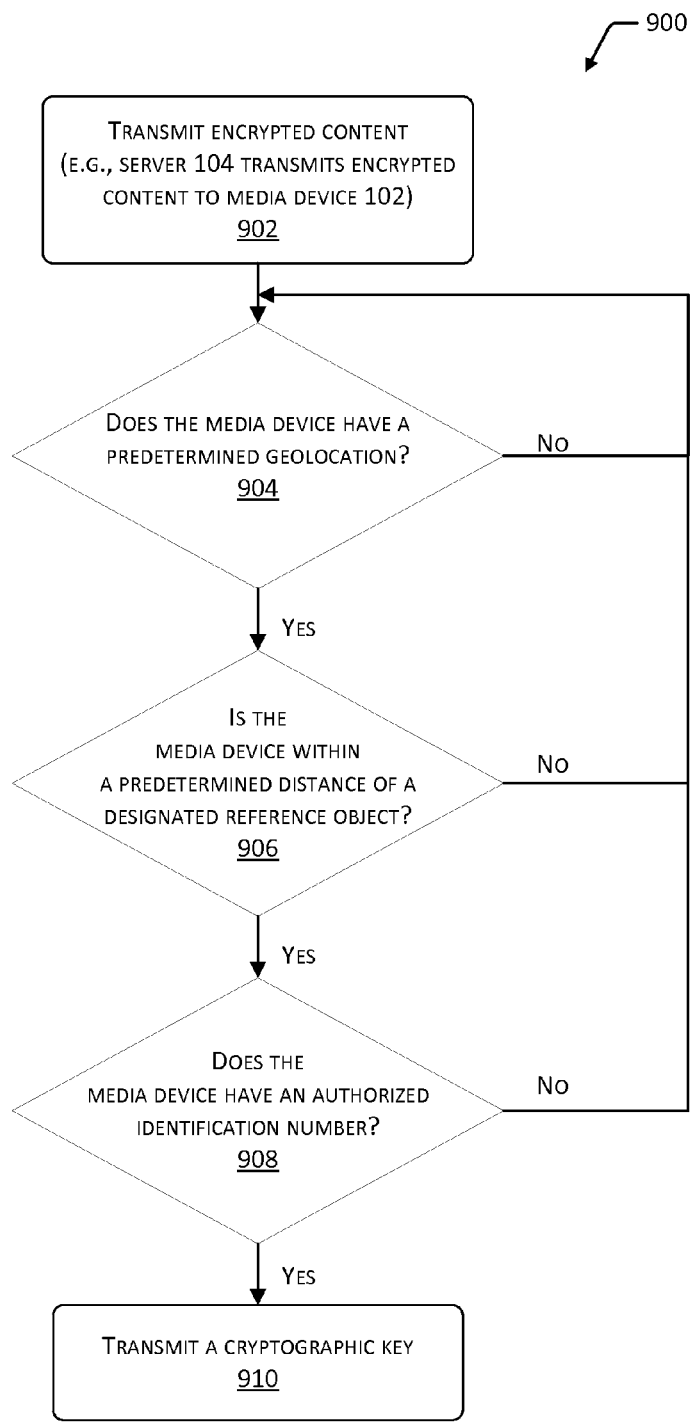
FIG. 9 is a flowchart illustrating a location-based decryption event process which includes determining the media device has an authorized identification number.

FIG. 9 is a flowchart illustrating a location-based decryption event process 900 which includes determining the media device has an authorized identification number. The process 600 may be implemented by the media device, the server 104, or both. Although the process 900 is described with reference to the flowchart illustrated in FIG. 9, many other methods of performing the acts associated with the process 900 may be used. For example, the order of many of the steps may be changed, some of the steps described may be optional, and additional steps may be included.

At block 902, the server 104 transmits the encrypted content 110 to the media device. For example, the server 104 may transmit the encrypted content 110 in response to the user requesting the encrypted content 110.

Block 904 determines whether the media device has a predetermined geolocation. For example, the server 104 may determine whether the media device is located within a predetermined zip code.

When block 904 determines that the media device has a predetermined geolocation, block 906 determines whether the media device is within a predetermined distance of the designated reference object 202. For example, the server 104 may determine whether the media device is within fifty feet of a particular access point.

When block 906 determines that the media device is within the predetermined distance 204 of the designated reference object 202, block 908 determines whether the media device has an authorized identification number. For example, the server 104 may determine the serial number of the media device has been registered on a list of devices approved to access the cryptographic key 112.

As indicated by block 910, when the server 104 determines that the media device includes an authorized identification number, the server 104 transmits the cryptographic key 112 to the media device.

As shown in FIG. 9, when the server 104 determines that the media device does not have the predetermined geolocation, or is not within the predetermined distance 204 of the designated object 202, or does not have an authorized identification number, the process may return to block 904.

Figure 10:
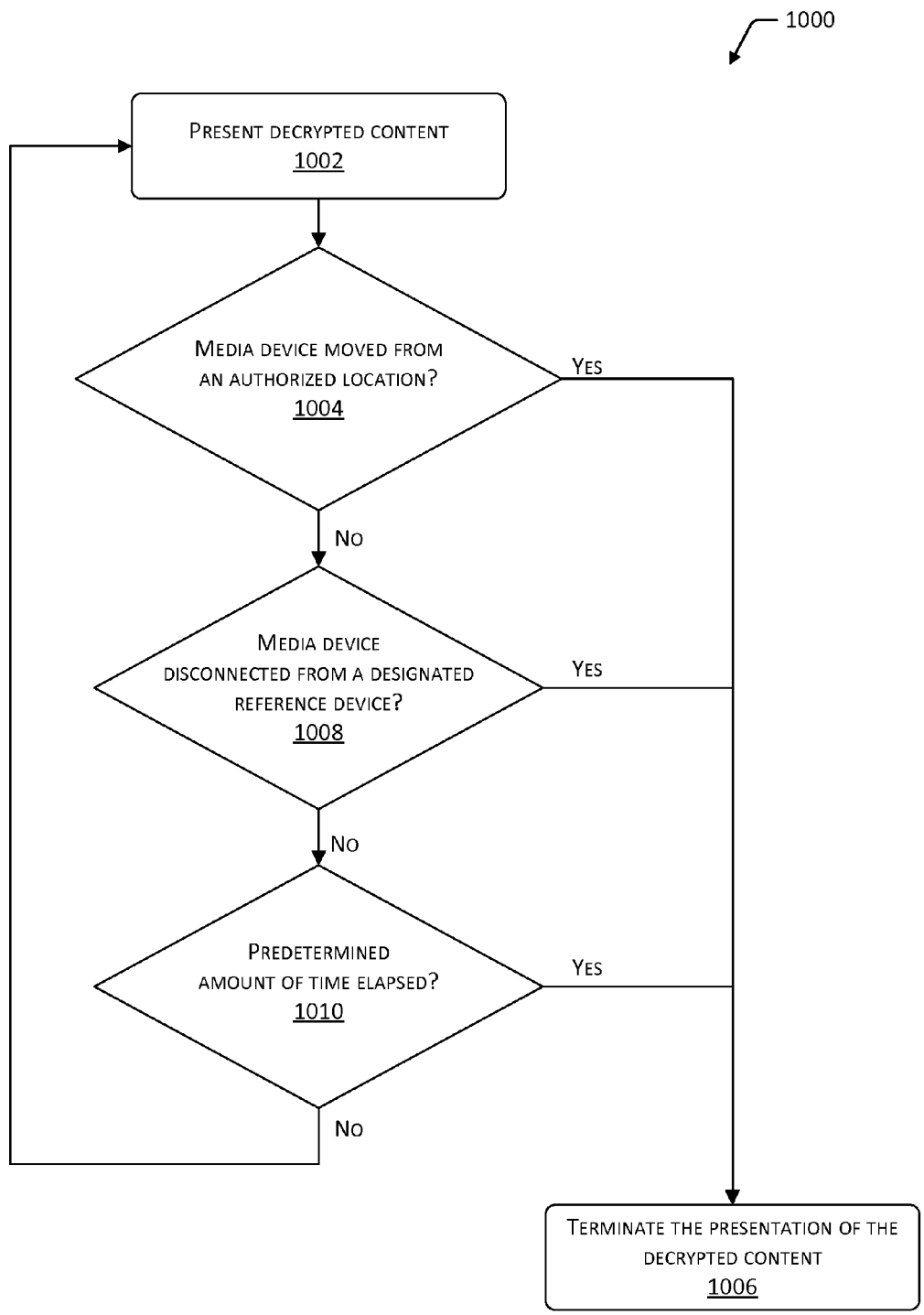
FIG. 10 is a flowchart illustrating a process of determining an encryption event.

FIG. 10 is a flowchart illustrating a process 1000 of determining an encryption event. The process 600 may be implemented by the media device, the server 104, or both. Although the process 1000 is described with reference to the flowchart illustrated in FIG. 10, many other methods of performing the acts associated with the process 1000 may be used. For example, the order of many of the steps may be changed, some of the steps described may be optional, and additional steps may be included.

The media device at block 1002 presents the decrypted content. As described above, the content has been decrypted and presented following a location-based decryption event.

Block 1004 determines whether the media device has moved from an authorized location 116(1). For example, the media device may determine that the media device is no longer located with the authorized room 116(1).

When the media device determines that the media device has moved from the authorized location 116(1), the process proceeds to block 1006. Block 1006 terminates the presentation of the decrypted content. For example, the content may be re-encrypted, the cryptographic key 112 may be revoked, and so forth.

When block 1004 determines that the media device has not moved from the authorized location 116(1), block 1008 determines whether the media device has been disconnected from the designated reference object 202.

When block 1008 determines that the media device has been disconnected from the designated reference object 202, the process proceeds to block 1006 which terminates presentation. When block 1008 determines that the media device has not been disconnected from the designated reference object 202, block 1010 determines whether a predetermined amount of time has elapsed. This may be time elapsed since issuance of the cryptographic key 112, since last access of the content, and so forth.

When block 1010 determines that a predetermined amount of time has elapsed, the process proceeds to block 1006 and terminates the presentation of the decrypted content. When the block 1010 determines that the predetermined amount of time has not elapsed, the process may return to block 1002 and the media device may continue to present the decrypted content.

In one alternative implementation, the media device is configured to encrypt content (e.g., cleartext material) based on the location of the media device. In one example, the media device encrypts cleartext material based on the location of the media device being within an unauthorized location 116(2). For example, the unauthorized location 116(2) may include a testing center. In this example, the media device is configured to encrypt material such as notes taken during class based on the media device being located within the testing center. Upon leaving the unauthorized location 116(2), the encryption may be removed or the corresponding cryptographic key 112 may be provided.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A media device comprising:
 a processor;
 a display device coupled to the processor;
 a location sensor coupled to the processor, the location sensor being configured to generate location data indicative of the media device with respect to a designated reference object, the designated reference object being associated with triggering a location-based decryption event or encryption event by the media device; and a memory device coupled to the processor, the memory device storing instructions, which when executed by the processor, cause the processor, in cooperation with the display device, the location sensor and the memory device, to: enter a connected state with the designated reference object when within communication range of the designated reference object;

receive encrypted content;

determine a first location indicative of the media device being within a predetermined distance of the designated reference object using the location data;

determine an occurrence of the location-based decryption event based on the first location of the media device being within the predetermined distance of the designated reference object;

based on the occurrence of the location-based decryption event: request a cryptographic key;

receive the cryptographic key; and based on the cryptographic key, decrypt the encrypted content to generate decrypted content;

display at least a portion of the decrypted content with the display device;

determine a second, different location indicative of the media device being beyond the predetermined distance of the designated reference object using the location data;

determine an occurrence of the location-based encryption event based on the second, different location indicative of the media device being beyond the predetermined distance of the designated reference object; and based on the occurrence of the location-based encryption event; terminate the display of the content with the display device.

2. The media device of claim 1 wherein the designated reference object comprises a second media device.

3. The media device of claim 1, wherein the designated reference object comprises a radio frequency identification tag.

4. The media device of claim 1, the location-based decryption event comprising the media device located within a geofence.

5. A method comprising:

generating, by a location sensor in a media device, location data indicative of the media device with respect to a designated reference object, the designated reference object being associated with triggering a location-based decryption event or encryption event with the media device;

entering, by the media device, a connected state with the designated reference object when the media device is within communication range of the designated reference object, the media device further:

accessing encrypted content;

determining a first location indicative of the media device being within a redetermined distance of the designated reference object using the location data;

determining an occurrence of the location-based decryption event based on the first location of the media device being located within the predetermined distance from the designated reference object;

based on the occurrence of the location-based decryption event:

generating decrypted content by decrypting at least a portion of the encrypted content using a cryptographic key; and causing the decrypted content to be presented on a display of the media device;

determining a second, different location indicative of the media device being beyond the predetermined distance of the designated reference object based on the location data;

determining an occurrence of the location-based encryption event based on the second, different location indicative of the media device being located beyond the predetermined distance from the designated reference object; and based on the occurrence of the location-based encryption event, the media device causing the presentation of the decrypted content to be terminated.

6. The method of claim 5, wherein determining the occurrence of the location-based decryption event further comprises determining a presence of the media device at a geolocation which is determined based on a satellite-based navigation system.

7. The method of claim 5, wherein determining the occurrence of the location-based decryption event further comprises: determining that the media device includes an authorized identification number.

8. The method of claim 5, wherein determining the occurrence of the location-based decryption event further comprises detecting a change in a connection state of the media device with the designated reference object.

9. The method of claim 5, wherein determining the occurrence of the location-based decryption event further comprises:

determining that the media device has received a password from a user input device.

10. The method of claim 5, wherein the location-based encryption event includes at least one of:

a change in a connection state of the media device with respect to the designated reference object;

an elapsed amount of time; an end of a time window;

a change in a location of the media device; or an expiration of the cryptographic key.

11. The method of claim 5, further comprising receiving the encrypted content after the occurrence of the location-based decryption event.

12. The method of claim 5, further comprising:

receiving at least one annotation associated with the decrypted content; and after the occurrence of the location-based encryption event, encrypting the at least one annotation.

13. The method of claim 5, wherein the designated reference object includes at least one of a communication device, a server, or a near field communication tag.

14. The method of claim 5, further comprising receiving the cryptographic key from the designated reference object.

15. The method of claim 5, wherein the encrypted content includes at least one of audio data, video data, electronic book data, application data, or annotation data.

16. An information processing system comprising:

a processor; and a memory device coupled to the processor, the memory device storing instructions, which when executed by the processor, cause the processor to:

determine location data indicative of a media device with respect to a designated reference object associated with triggering a location-based decryption event or encryption event with the media device;

enter a connected state with the media device when location data is indicative of the media device being within communication range of the designated reference object;

in response to receiving a request for encrypted content, transmit, to the media device, at least a portion of the encrypted content;
determine a first location indicative of the media device being within a predetermined distance of the designated reference object;
determine an occurrence of the location-based decryption event based on the first location of the media device being within the predetermined distance from the designated reference object;
based on the occurrence of the location-based decryption event, transmit, to the media device, a cryptographic key which is used by the media device to generate decrypted content based on the encrypted content;
determine a second, different location indicative of the media device being beyond the predetermined distance of the designated reference object;
determine an occurrence of the location-based encryption event based on the second, different location indicative of the media device being located beyond the predetermined distance from the designated reference object; and
based on the occurrence of the location-based encryption event, transmit to the media device data indicative of termination of a presentation of the decrypted content.

17. The information processing system of claim 16, wherein the instructions, when executed by the processor, cause the processor to operate with an input device to enable a user to designate the designated reference object.

18. The information processing system of claim 16, wherein determining the occurrence of the location-based decryption event further comprises:
determining that the media device includes an authorized identification number.

19. The information processing system of claim 16, the location-based decryption event further including:
the media device located within a predetermined geolocation based on a satellite-based navigation system.

20. The information processing system of claim 16, wherein:
the designated reference object comprises a second media device; and
the data indicative of termination of the presentation of the decrypted content includes at least one of:
data that causes the media device to re-encrypt the decrypted content; or
data that causes the media device to revoke the cryptographic key.

* * * * *